Oct. 9, 1956 C. F. DINLEY 2,765,924
FILTERING APPARATUS
Original Filed July 3, 1947
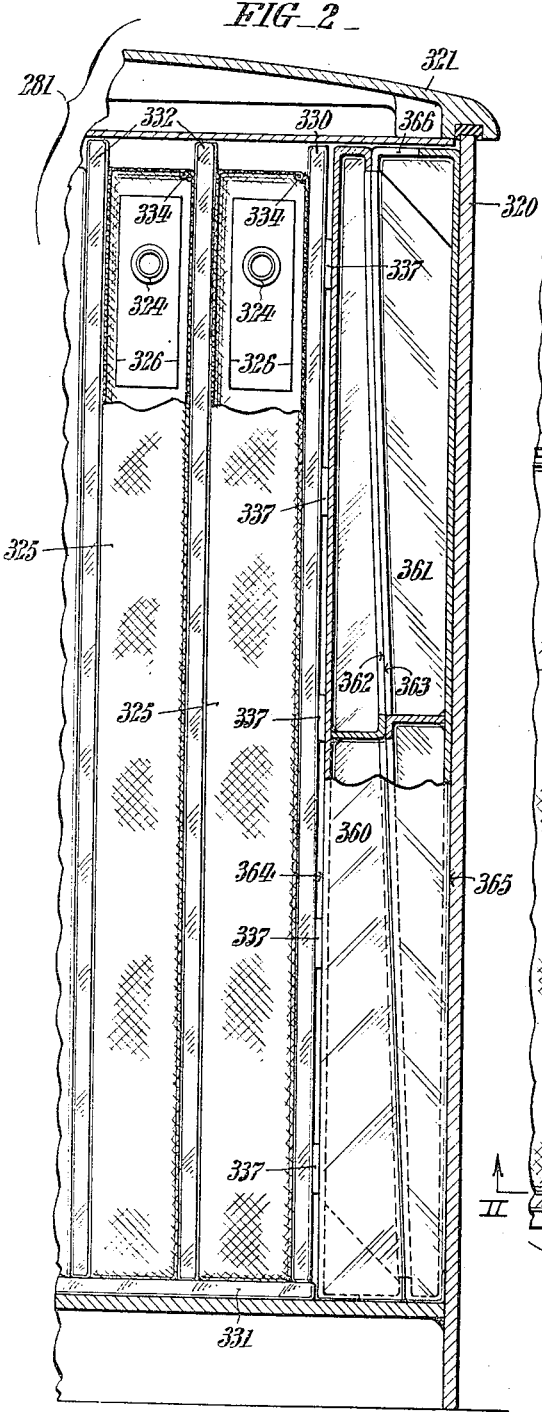
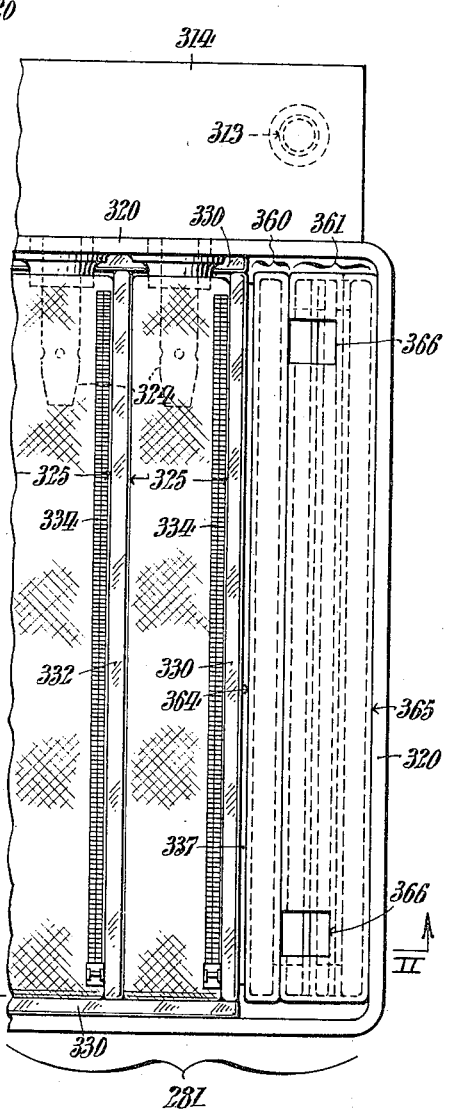
INVENTOR:
Clarence F. Dinley,
BY Paul & Paul
ATTORNEYS.

United States Patent Office 2,765,924
Patented Oct. 9, 1956

2,765,924

FILTERING APPARATUS

Clarence F. Dinley, Detroit, Mich., assignor to Detrex Corporation, Detroit, Mich., a corporation of Michigan Original application July 3, 1947, Serial No. 758,888. Divided and this application July 5, 1951, Serial No. 235,250

2 Claims. (Cl. 210—181)

This invention relates generally to filtering apparatus and more particularly to filtering apparatus for use in connection with dry cleaning machines and the like, such as the dry cleaning machine shown in the co-pending application filed July 3, 1947, under Serial No. 758,888, upon which United States Letters Patent No. 2,574,251 was granted on November 6, 1951. This present application is a divisional of the above mentioned earlier filed application, which shows how the herein disclosed filtering apparatus may be used advantageously with a dry cleaning machine.

Among the principal objects of this invention is efficient collection of foreign matter to facilitate the disposal thereof. This is accomplished in the present invention by the provision of filter bags, cloth or resilient, which receive internally the solvent to be filtered. When a filter bag has reached its capacity in collecting foreign matter, it may be removed, emptied and replaced for further filtering operation. In order to facilitate the removal of bags full of foreign matter, a removable spacing means is provided to provide necessary clearance.

This invention comprises generally a filter body, a plurality of resilient removable filter bags positioned in said body, a screening means separating said filter bags, a manifold, a plurality of nipples leading from said manifold and projecting into said filter bags, a movable spacing means positioned in said body to provide clearance for the removal of filter bags from said body and a discharge means for leading off filtered material.

Other objects and advantages of this invention will become apparent from the following description of the preferred form thereof, as illustrated in the accompanying drawings.

Fig. 1 is a partial plan view of a filter with the cover removed showing the spacer made according to the invention.

Fig. 2 is a partial sectional view taken as indicated by the arrows II—II of Fig. 1.

In describing the preferred embodiment of the invention illustrated in the drawings, a specific terminology will be employed for the sake of clarity. However, it is to be understood that there is no intention of being limited thereby to the specific terms so selected but on the contrary, each specific term is intended to include all technical equivalents which operate in a similar manner to accomplish a similar purpose.

The filter 281 includes a boxlike metal body 320 having a removable cover member 321 having a pressure sealed internal cover. A filter manifold 314 is mounted at the top of one side of the body 320 and connects to inlet pipe 313. Filter bag nipples 324 having radial holes are mounted in the body 320 and lead from the manifold 314 into filter bags 325 mounted on the nipples 324, discharging internally of the filter bags 325. Leather reinforcement pieces 326 are provided on the filter bags 325 where the nipples 324 enter the filter bags 325. The filter bags 325 are made of a twill or flexible material and it has been found that a commercial filter cloth having a thread count of 72 x 60 is a very good material for this purpose. A filter powder covers the interior of the bag to aid in catching foreign material. Surrounding the bag area within the filter body 320 are side filter screens 330 and bottom filter screens 331. Screens 332 are positioned between the filter bags 325. The filter bags 325 have openings at the top which are closed by slide fasteners 334.

As shown in the drawings, the spacing means made according to the invention consists of hollow wedged spaced spacers 360 and 361. The tapered faces 362 and 363 of the hollow wedge shaped spacers 360 and 361 bear against each other so that flat vertical surfaces 364 and 365 are provided for contacting the strengthening members 337 of the screen 330 and the adjacent wall of the filter housing 320. In the larger end of each hollow wedge shaped spacer a removal slot 366 is formed to function as a handle for removing the spacer. The operation of this form of spacing means involves the removal of one hollow wedge shaped spacer adjacent to the wall of the filter housing which provides clearance space for the removal of the filter bags 325.

While I have described a preferred form of my invention in considerable detail, it will be obvious to one skilled in the art that various changes and modifications can be made therein without departing from the spirit of the invention as hereinafter claimed.

Having thus described my invention, I claim:

1. A filtering apparatus comprising an enclosed filter body, a removable cover on said filter body having a pressure sealed internal cover, a plurality of substantially parallel filter bags, a plurality of mesh screens disposed between and around said filter bags and adapted to support said filter bags during filtering operations, and means to secure said filter bags and screens in close fixed relation during filtering operations and to facilitate removal of said bags and screens comprising a plurality of removable wedge shaped spacers disposed adjacent said filter bags.

2. The invention of claim 1 further characterized by the fact that said wedge-shaped spacers comprise a pair of truncated rectangular parallelepipeds so disposed that their oblique faces are opposed to each other when the spacers are inserted in the filter body, one of said spacers having handles disposed on the outer face thereof to facilitate removal from the filter body.

References Cited in the file of this patent

UNITED STATES PATENTS

| Number | Name | Date |
|---|---|---|
| 218,879 | Hartshorn | Aug. 26, 1879 |
| 647,099 | Krause | Apr. 10, 1900 |
| 1,337,251 | Miller | Apr. 20, 1920 |
| 1,412,557 | Fleetwood | Apr. 11, 1922 |
| 1,566,804 | Mortrude | Dec. 22, 1925 |
| 1,696,735 | Scoville | Dec. 25, 1928 |
| 1,796,532 | Nugent | Mar. 17, 1931 |
| 1,986,570 | Gans | Jan. 1, 1935 |
| 2,418,153 | Barnett | Apr. 1, 1947 |
| 2,551,312 | Bokich | May 1, 1951 |